United States Patent

[11] 3,602,552

| [72] | Inventor | Mason Edward Morgan<br>5702 East Gunnison Place, Denver, Colo. 80222 |
|---|---|---|
| [21] | Appl. No. | 866,787 |
| [22] | Filed | Sept. 17, 1969 |
| [45] | Patented | Aug. 31, 1971 |

[54] DRY FLOW PUMPS
4 Claims, 9 Drawing Figs.

| [52] | U.S. Cl. | 302/50, 302/56, 198/213 |
|---|---|---|
| [51] | Int. Cl. | B65g 53/48 |
| [50] | Field of Search | 302/50, 56; 198/213, 214, 64 |

[56] References Cited
UNITED STATES PATENTS

| 1,811,064 | 6/1931 | Raney et al. | 198/213 |
|---|---|---|---|
| 2,127,693 | 8/1938 | McCanless et al. | 302/50 |
| 2,299,470 | 10/1942 | Davis | 302/50 |
| 3,106,428 | 10/1963 | Lenhart | 302/50 |
| 3,377,107 | 4/1968 | Hodgson et al. | 302/50 |

FOREIGN PATENTS

| 133,291 | 1960 | U.S.S.R. | 198/214 |
|---|---|---|---|

*Primary Examiner*—Harvey C. Hornsby
*Assistant Examiner*—Merle F. Maffei
*Attorney*—R. H. Galbreath ABSTRACT: A screw conveyor arranged to deliver material through a pump barrel to a distribution main having means for introducing air under pressure to the material after it leaves the pump barrel to facilitate its passage through the main, there being a check valve plate at the discharge extremity of the barrel preventing blowback of the air through the barrel. The screw conveyor being provided with interchangeable flights to suit different types of commodities and with pneumatic means for preventing material from entering and damaging the screw conveyor bearings.

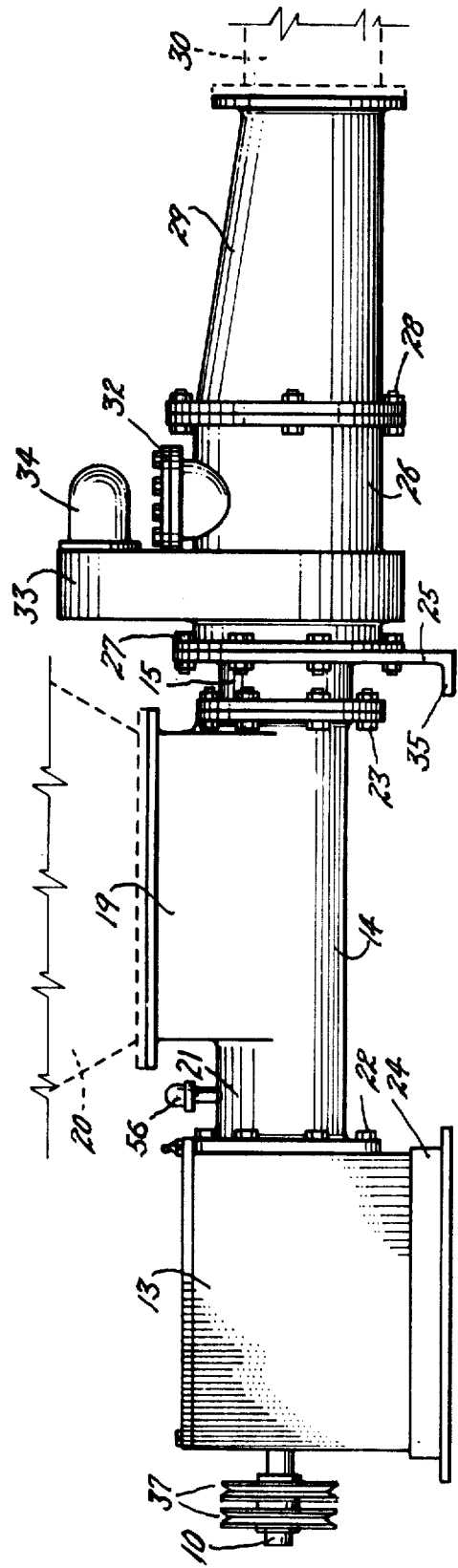
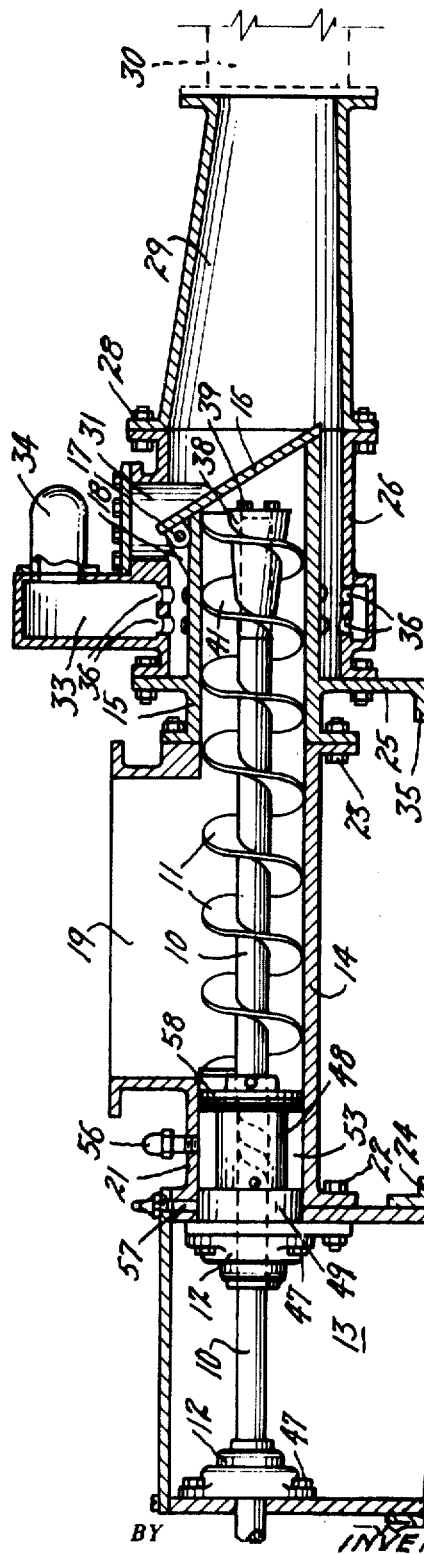

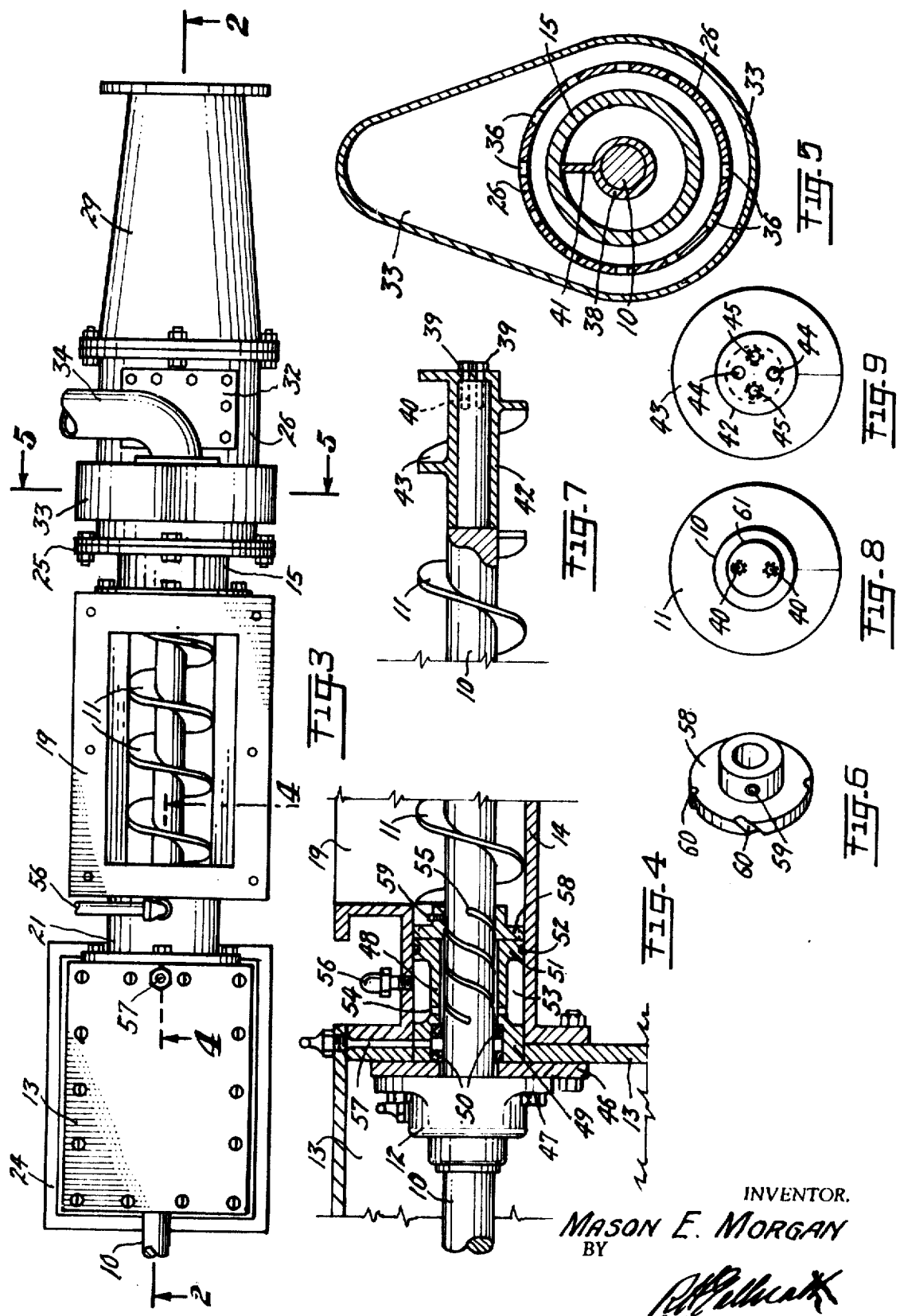

DRY FLOW PUMPS

This invention relates to a screw conveyor type of pump for forcing dry, granular or pulverulent materials, such as sand, Portland cement, dry chemical products, agricultural grains, ect., through a tubular delivery conduit.

Conveyors or pumps for this purpose have been troublesome due to the fact that the material being conveyed settles and packs into difficulty movable masses that clog the delivery equipment and greatly increase the power requirements. Attempts have been made to introduce compressed air into the flowing material to act in the nature of a lubricant to resist packing and reduce the power requirements, such as shown in prior U.S. Pat. Nos. 1,941,572 (1934) and 3,099,496 (1963). Such attempts have not been universally successful due principally to the fact that the air-saturated materials blow back toward the inlet extremity of the screw conveyor creating dust, power-loss problems and contamination of, and rapid wear on the pump bearings. Attempts have been made to eliminate the "blowback" by providing screw conveyor shafts with flights of successively decreasing pitch so as to pack the travelling material along the conveyor shaft so that the travelling material will resist "blowback" of the air, such as shown in prior U.S. Pat. Nos. 1,941,572, (1934) and 3,106,428, (1963) and by providing spaced-apart sets of flights of differing pitch along a screw conveyor shaft so as to form rotating plugs of packed material to resist "blowback," as shown in prior U.S. Pat. No. 3,370,890, (1968).

Such attempts have increased the power requirements and the air volumes required to an impractical degree so as to cause channeling and air loss through the packed rotating plugs resulting in objectionable duct and smog or increased bearing damage.

The principal object of the present invention is to provide highly efficient means, in a dry material pump of the screw conveyor type, whereby the air will be introduced to the material as a forwardly moving cylindrical envelope completely surrounding and travelling with, the material and to provide check valve means which will positively prevent "blowback" of the air and material.

Another object is to provide pneumatic bearing-sealing means for preventing entrained material from entering the screw conveyor bearings so as to effectively reduce bearing wear.

A further object is to provide conveniently changeable flight means on the shaft of the screw conveyor whereby the conveying action of the latter can be quickly and easily varied, without removal or replacement, to adapt the pump to various types of commodities.

Other objects and advantages reside in the detail construction of the invention, which is designed for simplicity, economy, and efficiency. These will become more apparent from the following description.

In the following detailed description of the invention, reference is made to the accompanying drawings which form a part hereof. Like numerals refer to like parts in all views of the drawings and throughout the description.

In the drawings:

FIG. 1 is a side view of the improved dry material pump of this invention;

FIG. 2 is a vertical longitudinal section, taken on the line 2—2, FIG. 3, with one form of the screw conveyor of the pump illustrated in elevation;

FIG. 3 is a top plan view of the pump shown in FIGS. 1 and 2;

FIG. 4 is an enlarged fragmentary, longitudinal detail section, taken on the line 4—4, FIG. 3 showing the bearing-sealing means;

FIG. 5 is a similarly enlargeable cross section taken on the line 5—5, FIG. 3 showing the air introducing means;

FIG. 6 is a detail perspective view illustrating a rotating baffle disc, employed in the bearing-sealing means of FIG. 4, to be later described;

FIG. 7 is a similarly enlarged fragmentary side detail view of the discharge extremity of the screw conveyor showing, in section, an alternate form of conveyor flight mounted thereon;

FIG. 8 is a still further enlarged detail end view of the discharge extremity of the shaft of the screw conveyor showing bolt holes for the receipt of attachment screws for attachment of a shaft cap thereon; and FIG. 9 is a similar detail rear end view of a selected shaft cap showing the arrangement of bolt holes therein for the attachment and detachment of the cap to the shaft as will be later described.

The present invention employs a rotatable scroll or screw conveyor comprising a horizontal elongated conveyor shaft 10 concentrically surrounded for a portion of its length by a continuous spiral conveyor flight 11 of substantially uniform pitch. The rear extremity of the conveyor shaft 10 is rotatably mounted in a pair of suitable, conventional, spaced-apart, horizontally aligned, thrust bearings 12, positioned within a permanently fixed bearing box 13, so as to cantileverly support the shaft 10.

The conveyor shaft 10 extends rearwardly from the bearing box 13 to receive a V-belt pulley 37 or other drive device. The shaft 10 extends forwardly from the bearing box 13 through a hopper housing 14 and terminates within a cylindrical pump barrel 15. The forward extremity of the pump barrel is bevelled forwardly and downwardly and is gravitationally closed by a check valve plate 16 suspended from a hinge pin 17 in a hinge fitting 18 which is mounted on the top of the discharge extremity of the pump barrel 15.

The hopper housing 14 has an open top and is U-shaped in lateral cross section so as to closely surround the lower 180° of the screw conveyor. The open top of the housing 14 is surrounded by a rectangular hopper base 19 which is preferably flanged to receive a conventional feed hopper or other feed device such as shown in broken line at 20 in FIG. 1. The hopper housing 14 is also provided with a cylindrical, rearwardly extending bearing housing 21 which is bolted, as shown at 22, to the bearing box 13 concentrically about the shaft 10. The pump barrel 15 is similarly bolted to the forward extremity of the hopper housing 14 concentrically about the screw conveyor, by means of suitable attachment bolts 23.

The bearing box 13 is preferably provided with base angle irons 24 by means of which it may be permanently mounted upon a suitable supporting structure. The pump barrel 15 is surrounded adjacent its rear extremity, with a vertical supporting plate 25 having a base flange 35 which may also be permanently mounted on the supporting structure to fixedly support and align the barrel 15 with the conveyor shaft.

The forward discharge extremity of the pump barrel 15, including the check valve plate 16, is concentrically enclosed by a cylindrical air chamber 26 of slightly larger diameter than the barrel 15. The forward and rear extremities of the air chamber 26 are flanged. The rear flange is secured to the supporting plate 25, by means of suitable attachment bolts 27, and the forward flange is connected, as shown at 28, to a forwardly extending, eccentrically conical accelerating chamber 29 which delivers the pumped material to the conventional distribution main of the project, as shown in broken line at 30 in FIGS. 1 and 2. The top of the air chamber is provided with an access opening 31 covered by a removable sealing plate 32 which allows access to both the check valve plate 16 and the forward extremity of the screw conveyor.

The air chamber 26 passes through, is surrounded by, and sealed to, a relatively flat, pear-shaped, air manifold 33, as shown in FIG. 5, which extends upwardly to receive compressed air through a suitable air nipple 34 which when in use is connected to any conventional compressed air source. An annular series of uniformly spaced-apart air ports 36 communicate between the manifold 33 and the air chamber 26 to uniformly distribute compressed air completely about the periphery of the discharge extremity of the pump barrel 15 and about the material being discharged therefrom, as shown by the arrows in FIG. 2, to carry and propel the material through the accelerating chamber 29 to the distribution main 30.

Attention is called to the fact that the check valve plate 16 extends above the pump barrel 15 so as to be in the air stream discharging from the air chamber. The inclined valve plate directs a portion of the air stream downwardly and forwardly so that the valve plate and its hinge fittings are constantly washed by a pressurized stream of air so as to reduce the possibility of jamming and clogging the valve plate by entrapped material.

The fixed conveyor flight 11 terminates substantially midway of the pump barrel 15 but the conveyor shaft 10 continues forwardly at reduced diameter, as shown at 61 in FIGS. 7 and 8, and terminates closely adjacent the closed position of the check plate 16, to interchangeably receive various flight adapters each designed specifically for the various commodities to be pumped and for various field conditions encountered. For instance, the flight adapted shown in FIG. 2, comprises an elongated conical sleeve which forms a cup-shaped shaft cap 38 which is positioned about and secured over the shaft extremity. The cap has a closed bottom which is secured to the end of the shaft by means of diametrically spaced cap screws 39 threaded into tapped bolt holes 40 is said bottom. The cap is surrounded by spiral flights 41 of any desired pitch. As illustrated in FIG. 2, the pitch is the same as the pitch of the conveyor flight 11 and continues the flow to the discharge of the pump barrel 15. The large diameter of the conical cap 38 is placed forwardly so as to reduce the area of the discharge from the pump barrel to create lateral compression in the discharging material to resist "blowback" of air and material into the pump barrel 15 when the check valve plate 16 is opened by the discharging material.

The conical shaft cap 38 can be replaced by caps of different designs to produce a second flight adapter to suit the particular product being pumped. Such a different design is illustrated in FIG. 7 in which a cylindrical cap 42 of uniform diameter is placed over the reduced diameter extremity of the shaft and secured in place by the cap screws 39. The cap 42 is provided with paddles or flights 43 of any desired pitch, direction or design to suit the particular product to be pumped. There is no lateral compression applied to the product by the cap 42 since it is of uniform diameter. Axial compression may be applied by having the flights 43 of lesser pitch than the conveyor flights 11 if desired.

Since the caps 38 and 42 become firmly attached to the shaft extremity after long use and, since space around the shaft extremity is extremely limited, means are provided for removing the caps by placing two diametrically spaced-apart, nonthreaded bolt holes 44 in the closed end of the cap, as shown in FIG. 9, which can be aligned with the two tapped holes 40 in the end of the shaft and two additional threaded bolt holes 45 positioned circumferentially intermediate the first two holes 44. Therefore, to remove a stuck sleeve the cap screws 39 are removed from the holes 40 and 44 and threaded into the second pair of holes 45 so that when tightened they will contact and bear against the end of the shaft to pull the stuck sleeve therefrom.

Means are provided for sealing the thrust bearings 12 against the intrusion of dust and abrasive particles from the pump barrel 15, as shown in FIGS. 4 and 6. The sealing means comprises a bearing plate 46 mounted against the inside face of the wall of the bearing box 13 about the shaft 10 to which the forward thrust bearing is mounted by means of attachment bolts 47. A spool-shaped, cylindrical bearing block 48 is wedged or otherwise secured within the bearing housing 21 about the shaft 10. The bearing block has a relatively thick rear flange 49, which fits against the bearing plate 46 and which is counterbored to form a socket for two spaced-apart conventional shaft-sealing gaskets 50 surrounding the shaft 10, and a relatively thin forward flange 51 which is sealed to the bearing housing by means of a suitable O-ring 52. The open space between the flanges 49 and 51 around the bearing block 48 forms an annular compressed air chamber 53 completely round the bearing block 48.

A plurality of air ports 54 communicate between the rear portion of the air chamber 53 and the shaft 10 to feed air into a helical air channel 55 formed in the shaft which is pitched to convey and direct the air forwardly through the bearing block 48 to the hopper housing 14.

Compressed air is supplied to the air chamber 53 from a suitable source through an air supply fitting 56 and lubrication, preferably dry graphite, is supplied to the gaskets 50 through lubrication channel 57.

It can be seen air and entrained material cannot pass from the hopper housing 14 about the bearing block 48 into the air chamber 53 due to the fact that the chamber pressure exceeds the housing pressure and it can be also seen the air and entrained material cannot flow along and about the shaft toward the gaskets 50 due to the velocity of the air flowing spirally forward through the spiral channel 55.

It has been found that occasionally should a car or truckload of material be suddenly and simultaneously dumped into the hopper 20 air and dust would be forced into the air chamber and to the shaft. As a further precaution against such happening a rotating baffle disc 58, such as shown in FIG. 6, is fixed to the shaft by means of a setscrew 59 in closely spaced relation to the forward face of the bearing block 48 in and to the cylindrical inner wall of the bearing housing 21. The baffle disc 58 acts to prevent the impact energy of sudden loads from reaching the bearing block 48. It also acts to throw any material that may force past the disc tangentially outward away from the shaft. The periphery of the disc 58 is preferably provided with forwardly inclined flow-directing grooves 60 which cause the rotation of the disc to impel material into the housing 14 and away from the bearing block 48 and away from the shaft-sealing gaskets 50.

While a selected form of the invention has been above described, it is understood that mechanical variations and detail substitutions can be made by one skilled in the art without departing from the spirit of the invention.

I claim:

1. A dry flow pump comprising:
  a. a hopper housing adapted to receive material to be pumped;
  b. a pump barrel exiting from said hopper housing and terminating in a forwardly and downwardly inclined discharge extremity;
  c. a rotatable, power-driven screw conveyor passing through said hopper housing and into said pump barrel to force material from the former through the latter;
  d. an air chamber circumferentially surrounding said pump barrel in radial-spaced-relation to the latter, the forward extremity of said air chamber being open to discharge air circumferentially about the discharge extremity of said pump barrel;
  e. an air manifold substantially surrounding said air chamber and provided with means for receiving compressd air from an external source;
  f. an annular plurality of circumferentially spaced ports communicating from said air manifold to said air chamber;
  g. a shaft extension projecting rearwardly from said screw conveyor;
  h. a cylindrical bearing housing projecting rearwardly from said hopper housing concentrically about said shaft extension;
  i. a shaft bearing positioned at the rear extremity of said bearing housing and rotatably supporting said screw conveyor;
  j. a spool-shaped cylindrical bearing block having forward and rear flanges positioned in said bearing block about said shaft, the intervening circumferential space between said flanges forming a cylindrical compressed air chamber about said block;
  k. means for sealing the rear extremity of said bearing block to said shaft and means for sealing the forward flange to said bearing housing;
  l. means for conducting compressed air to said chamber;

m. a plurality of air ports positioned at the rear of said air chamber and communicating with said shaft; and n. a helical air channel formed in the cylindrical surface of said channel pitched to convey the air received from said ports spirally forward to the hopper housing so as to detract the air away from said shaft bearing to reduce the possibility of bearing damage.

2. A dry flow pump as described in claim 1, having:
a. a rotating baffle disc affixed to said shaft forwardly of and in closely spaced relation with said bearing block and the forward flange of the latter acting to centrifugally throw material away from said shaft before the material reaches said bearing block.

3. A dry flow pump as described in claim 2, having:
a. flow directing channels in said baffle disc inclined to direct material away from said bearing block as said shaft rotates.

4. A dry flow pump as described in claim 3, having:
a. means for introducing lubrication between the shaft-sealing gaskets.